United States Patent

Nolting et al.

[15] 3,646,802
[45] Mar. 7, 1972

[54] AUTOMATIC POUR-POINT-MEASURING METHOD AND APPARATUS

[72] Inventors: Jerry L. Nolting, Fishkill; Alan D. Rouse, Pawling, both of N.Y.

[73] Assignee: Texaco Inc., New York, N.Y.

[22] Filed: Mar. 11, 1970

[21] Appl. No.: 18,426

[52] U.S. Cl. .................................................73/17
[51] Int. Cl. .................................................G01n 25/02
[58] Field of Search.........................................73/17

[56] References Cited

UNITED STATES PATENTS 3,289,460  12/1966  Anderson ...........................73/17
3,498,104  3/1970  Van Kervoort ......................73/17

Primary Examiner—James J. Gill
Assistant Examiner—John Whalen
Attorney—Thomas H. Whaley and Carl G. Ries

[57] ABSTRACT

A method and apparatus for determining pour point of a substance. The substance is first cooled below its pour point and a temperature-measuring probe is placed resting on the top surface. Then the substance is warmed from the top down while the probe temperature is continuously measured. The temperature will remain constant from the time the probe begins to sink until it is no longer free to do so. This is the pour point temperature.

13 Claims, 3 Drawing Figures

PATENTED MAR 7 1972 3,646,802

AUTOMATIC POUR-POINT-MEASURING METHOD AND APPARATUS

BACKGROUND OF THE INVENTION

1. Field of the Invention

This invention relates generally to the measurement of pour point for any fluid material. More specifically it is concerned with a method and an apparatus for measuring pour point of most substances that may be liquid at some normal temperatures and substantially or entirely solid at lower temperatures. The invention is particularly applicable to pour point measurements of petroleum products.

2. Description of the Prior Art

Heretofore there have been various types of instruments developed for measuring the pour point of liquids, particularly petroleum products. However, these instruments have all operated on the basis of measuring the solidification as the substance was cooled from its liquid state. Furthermore, the standard ASTM pour point test also is based upon a cooling of the substance being measured, while testing the ability to deform or pour, as it reaches and goes below the pour point temperature. All such prior methods and instruments have various drawbacks. Not the least of such drawbacks is the margin of error in determining the pour point, and even more is the length of time required to carry out the ASTM standard test.

Some of the foregoing known prior art entails viscosity effects or other attributes stemming from the solidification that takes place as a fluid is chilled. For example, known prior art employs such things as a suspended ball in a rotated cup of the liquid, the pour point of which is measured. This acts on principles involving the tendency of the ball to be moved around with the cups as the liquid becomes solidified.

Or, other known examples include ones such as an arrangement with a floated-reflecting surface resting on the surface of the liquid, the pour point of which is being measured. It will tip with the container of the liquid when rocked about a horizontal axis, but only after the liquid solidifies.

The applicant's invention, on the other hand, provides a method that operates in the opposite manner. The substance to be measured is first cooled below the pour point and then warmed up from the top down, while a temperature measuring probe is rested on the top surface of the substance. This records the temperature as the pour point is reached in a rising rather than in a falling direction.

SUMMARY OF THE INVENTION

Briefly, the invention may be described as a method of determining the pour point of a fluid. Such method comprises the steps of cooling said fluid below the pour point thereof, and placing temperature-measuring means on the upper surface of said cooled fluid. The said temperature means has a density greater than that of said fluid from said upper surface downward, and measuring the temperature at said temperature means as it falls in said warming fluid.

Again, briefly, the invention concerns automatic pour-point-measuring apparatus for determining the pour point of a given substance. Such apparatus comprises a container for a predetermined quantity of said substance, and probe means for measuring the temperature of said substance. The said probe means has a density greater than that of said substance when it is fluid. The apparatus also comprises means for resting said probe means on top of said substance when it is colder than said pour point, and means for raising the temperature of said substance in said container from the top down.

Once more, briefly, the invention may be described as a combination that includes a predetermined quantity of a substance, the pour point of which is to be measured, and a container for said quantity of substance. The combination also includes a temperature-measuring probe adapted for resting on top of said substance when it is below the pour point thereof. The said probe has an effective density greater than the density of said substance when it is above the pour point thereof. The combination also includes means for measuring the temperature of said probe while it rests on the top of said substance and until it has fallen into the said substance at least a substantial distance as said substance is warmed from the top down.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

It will be noted that this invention concerns a method and apparatus for measuring pour point of fluids. It is particularly applicable to pour point measurements for petroleum products e.g., lubricating oils and other products, where the pour point characteristic is important, or at least helpful in connection with manufacturing or otherwise treating various products.

It will be appreciated, as the description proceeds, that the form of the probe being employed might vary. Generally, the only limitations as to the physical form the probe might relate to substances that are highly viscous even after having reached the pour point as the temperature is raised. In such situations, if the probe were one having a substantial vertical length, there would be introduced a factor which might make the operation difficult or even not feasible. Consequently, it is preferred to employ a spherically shaped probe so that the resistance of the probe to movement through the substance, when liquid, will be at a minimum.

THE APPARATUS

Figure 1:
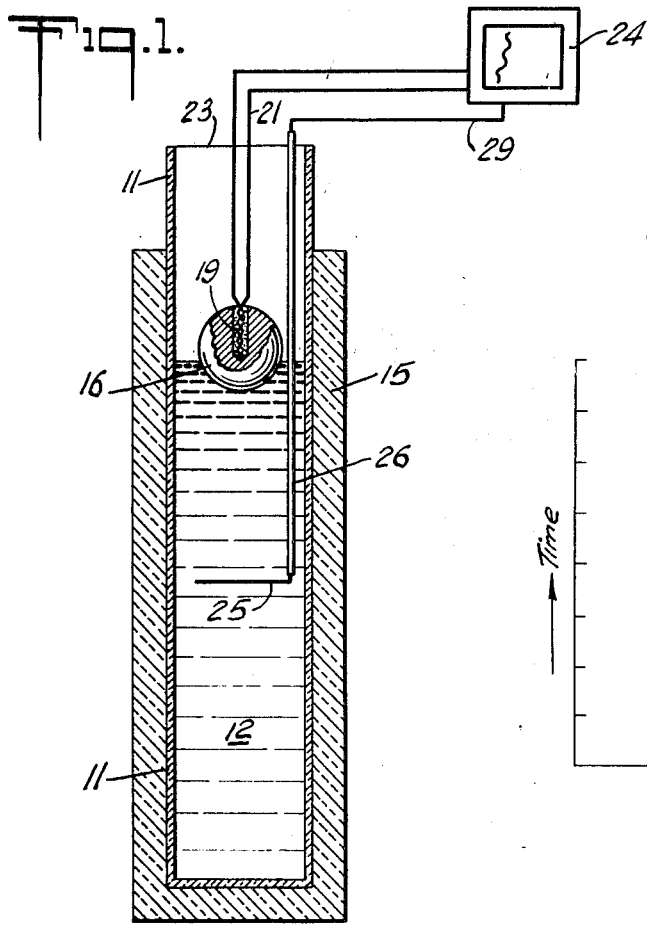
FIG. 1 is a schematic diagram illustrating apparatus according to one modification of the invention.

Referring to FIG. 1, it is pointed out that a preferred form of apparatus is schematically illustrated. It includes a container 11 for a substance 12 that is to have the pour point thereof measured. The container 11 may be made of any feasible material. However, it is preferably glass or similar heat-insulating material for reasons which will appear more fully below.

The substance 12 will usually have been placed in the container 11 when in liquid form. Thereafter it is chilled to a temperature substantially below the pour point temperature of the substance, i.e., until the substance is completely solidified.

There is a heat-insulating outer layer or jacket 15 that surrounds the container 11 on all sides and the bottom. This provides heat insulation for the substance 12 within the container 11. Such jacket might be constructed of any good heat insulator such as one of the foams. It will be noted that because the sleeve or outer layer 15 surrounds container 11 underneath as well as on all sides, but leaves the open top of the container extending out of the top of the jacket, and on account of the container being made of glass, the warming of the substance toward the surrounding temperature takes place from the top down.

There is a probe 16 that is spherical in shape and is constructed of a relatively dense, good heat-conducting material. Preferably this probe ball is made of copper, brass, bronze, etc. and it includes a drilled well 19 that contains one junction of a thermocouple. Such junction may, of course, take various physical forms, e.g., the twisting together of a pair of bimetal wires 20 and 21 in the manner schematically illustrated. The arrangement is well known in the thermocouple art, and the structure is standard practice. The bimetals employed may be any feasible materials, e.g., iron and constantan. These two wires lead from the probe to a temperature recorder 24 that may be a commercial instrument. As schematically indicated, the recorder includes a motor-driven chart for recording temperature over a given period of time.

It is to be noted that the wires 20 and 21, which connect the probe 16 to the recorder 24, are schematically illustrated and shown as straight lines. However, it will be understood in fact that the physical arrangement is such as to permit free vertical movement of the probe 16 without any restraint.

The probe 16 may be lowered or otherwise introduced through an open top 23 of the container 11. It rests on the upper surface of the substance 12 when the latter is in its solid state.

An arrangement may be included for recording a given point on the temperature chart as the probe 16 sinks into the substance 12 when it melts. This includes a bare contact wire or electrode 25 that extends horizontally at a predetermined depth within the substance 12. This electrode is connected electrically to one end of an insulated wire 26 that extends up out of the top of the container 11. The electrical circuit from electrode 25 is continued and is connected to the recorder 24 by connection 29, as indicated. This circuit is connected electrically to the thermocouple in such a manner as to cause a sudden break in the temperature-measuring curve upon contact of the ball 16 with the electrode 25.

Figure 2:
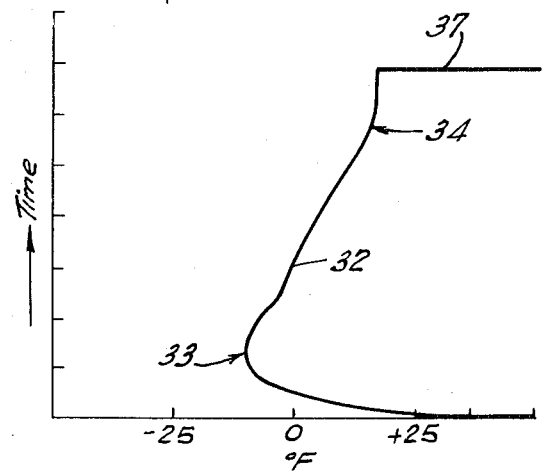
FIG. 2 is a graph illustrating the temperature measurement as carried out by apparatus like that illustrated in FIG. 1

One manner of operating the apparatus illustrated in FIG. 1 is indicated by the graph illustrated in FIG. 2. Thus, after the substance 12 has been chilled to its solid state, the probe 16 is placed on the upper surface thereof and the container 11 which is surrounded by the heat-insulating jacket 15 is placed in an atmosphere with the temperature well above the pour point of the substance 12. Then, the temperature measurement is begun.

As shown by a curve 32 in FIG. 2, the temperature which is measured by the probe 16 goes from about room temperature down to a low point 33, where the temperature substantially coincides with that of the solid substance 12. In the illustrated graph this temperature is approximately minus 10° F. Thereafter, as the substance 12 rises in temperature from the surface downward, the measured temperature (of the probe 16) gradually rises until the substance 12 begins to melt and reaches its fluid state, i.e., the pour point. This point is indicated on the graph by an arrow 34 on FIG. 2. The temperature thereafter remains substantially constant as shown by the vertical portion of the curve.

It may be noted that the warming of the substance 12 takes place from the top down because of the heat insulation that surrounds it, except for the top. Furthermore, it is important to have the container 11 not be a good heat conductor in order to avoid conduction of heat down the sidewalls thereof since that would add some warming effects from the sides inward.

After the temperature of the substance 12 has reached its pour point, the substance becomes liquid and it will no longer support the probe 16. The probe is constructed of a material that is more dense than the density of the liquid substance so that it will begin to sink into the substance 12. In this manner it will follow the solid-liquid interface and indicate the temperature that is in correspondence with the pour point. In this way, the ball will sink down into the substance 12 until it makes contact with the horizontal electrode 25. As indicated above, this contact will cause a sudden break in the temperature-indicating curve such as a horizontal line 37 of the curve 32 in FIG. 2. This then indicates the fact that the temperature being recorded just prior to the break is indicative of the pour point temperature of the substance 12.

It is to be noted that the pour point measurement may be carried out without the use of any electrode-located part way down in the substance. If such is the case, the recorded temperature curve will look similar to that illustrated in idealized form in FIG. 3. Thus, the vertical straight line portion of the curve indicates a constant temperature, and it is this temperature that is the pour point.

Figure 3:
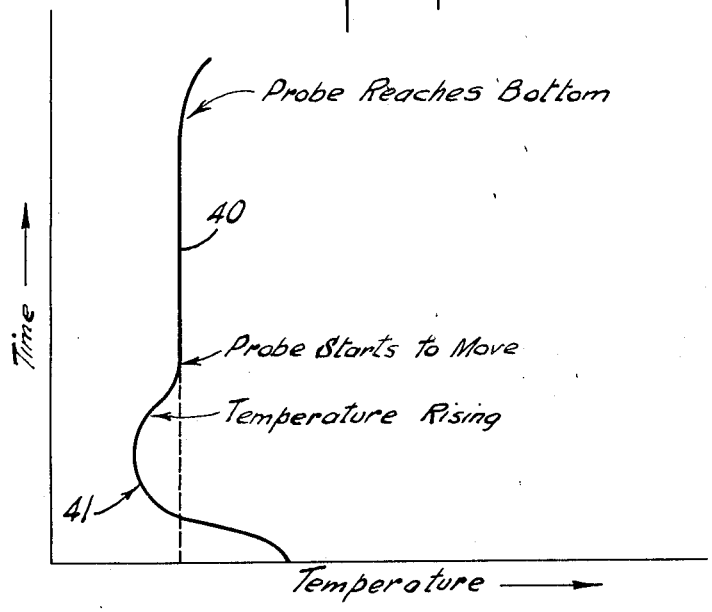
FIG. 3 is an idealized graph illustrating the temperature measurement as carried out by a method according to the invention.

The action indicated by FIG. 3 is similar to that described above except for the omission of the electrode. For example, the temperature of the probe 16 will commence at some ambient level as indicated by the beginning of a curve 40 at time zero on the graph. This is just before the probe is placed onto the surface of the substance 12 which has been previously chilled well below its pour point temperature. The temperature then falls as the probe is cooled to the same temperature as that of the substance 12. This is indicated by a low temperature point 41 on the total curve 40. Thereafter the temperature commences to rise as the temperature of the substance 12 is rising by heat transfer from the top downward. When the substance reaches its pour point temperature, it becomes becomes liquid and the probe begins to sink down therein and follow the solid-liquid interface. This condition is indicated by the caption "Probe Starts to Move" on the FIG. 3 curve. Thereafter, as the probe continues to sink into the substance, the temperature will remain substantially constant until the probe has reached the bottom of the container 11. After that, the temperature of the probe will begin rising again as the substance continues to be warmed and become entirely liquid. It will be understood that the straight, constant temperature portion of the curve represents the measurement of pour point for the substance. This measurement is accurate to a high degree of repeatability for any given substance.

THE METHOD

It will be appreciated by one skilled in the art that this invention (as it relates to a method for determining pour point of any fluid) might be carried out with various different forms of apparatus. Such method includes the following steps, with the order as indicated. However, of course, in certain instances it might be that the order of carrying out the steps might be changed without changing the substance of the method.

The first step involved in a preferred method is that of cooling the fluid (that is to have the pour point measured) substantially below the pour point thereof. This of course may be carried out in any feasible manner, e.g., refrigerating a container of the fluid for a sufficient period of time to cause it to become well solidified. This may be done in a separate refrigerator (not shown) after the fluid has been placed in the container.

A second step of the method is that of placing temperature-measuring means on the upper surface of the cooled fluid which is now a solid. It will be appreciated that in carrying out this step the temperature-measuring means might take various forms, e.g., an elongated thin pencil-shaped element (not shown) might be used, so long as the temperature-measuring portion is located at the tip which is rested on the surface of the cooled fluid. In carrying out the method with our preferred structure, this step would involve the use of a spherical probe having temperature-measuring means associated therewith. It is to be noted that whatever form of temperature-measuring means is employed, one limitation of importance is that the density of such temperature means must be greater than the density of the fluid when melted. This is so that the temperature-measuring means will sink into the fluid as the latter becomes liquid. Of course the manipulative step itself could be carried out manually and involves the handling of the probe of whatever form, including placing it through the open top of the container.

Another step is that of warming the fluid from the upper surface thereof downward. This step might be carried out in various ways. Preferably it merely entails the use of sufficient heat insulation around the container for fluid, such that the only substantial transfer of heat will be from the surrounding atmosphere that is in contact with the upper surface of the substance. Consequently, the warming of the fluid takes place from the top downward which permits the probe to automatically follow the fluid-solid interface as the substance is warmed to the pour point. Thus, the warming takes place downward through the substance.

Finally, the method involves a step of measuring the temperature at the foregoing temperature means, as it falls in the warming fluid. This temperature measurement gives an accurate indication of pour point temperature for the substance. It will be clear that while the measurement is illustrated as being carried out by a temperature-recording chart, or similar instrument, it could also be measured by having a visually observable thermometer to indicate the temperature of the probe. Thus, the temperature measurement could be made by visual observation and recorded mechanically if desired, or various combinations of automatic and manual measurements might be employed.

It will be appreciated that the invention is readily adaptable for permitting a large number of pour point measurements to be carried out simultaneously. Thus, the number of measurements is only limited by the considerations of space and numbers of containers with accompanying apparatus, that are to be used. In this way, the operation of a very large number of pour point measurements could be handled by one individual.

Furthermore, it will be clear to one skilled in the art that this invention is readily adaptable for providing output signals related to the pour point temperature measurement of a substance for use in any desired process. For example, it might be used by way of indication and/or control in lube-oil-dewaxing plants and other petroleum refinery operations.

While the foregoing embodiments of the invention have been described in considerable detail in accordance with the applicable statutes, this is not to be taken as in any way limiting the invention but merely as being descriptive thereof.

We claim:

1. A method of determining the pour point of a fluid, comprising the steps of
    cooling said fluid below the pour point thereof,
    placing temperature-measuring means resting on the upper surface of said cooled fluid,
    said temperature means having a density greater than that of said fluid when melted,
    warming said fluid only from said upper surface downward, until said fluid reaches the pour point thereof, and
    measuring the temperature at said temperature means as said temperature means falls in said warming fluid, said measured temperature remaining substantially constant as said temperature means falls providing an indication of said pour point.

2. The method according to claim 1, further including the step of recording said measured temperature in order to indicate the pour point temperature which is substantially constant during the time when the temperature means is falling in said warming fluid.

3. The method according to claim 2, further including the step of arresting said temperature means after it has fallen a predetermined distance in said warming fluid.

4. Automatic pour-point-measuring apparatus for determining the pour point of a given substance, comprising
    a container for a predetermined quantity of said substance,
    probe means for measuring the temperature of said substance,
    said probe means having a density greater than that of said substance when it is fluid,
    means for resting said probe means on top of said substance when it is colder than said pour point, and
    means for raising the temperature to the pour point of said substance in said container only from the top down.

5. Automatic pour-point-measuring apparatus according to claim 4 wherein
    said means for raising the temperature comprises heat-insulating means surrounding said container except for the top thereof.

6. Automatic pour-point-measuring apparatus according to claim 5 wherein
    said probe means is spherical, and
    said means for resting the probe means comprises an opening at the top of said container large enough to permit placement of the probe means onto the upper surface of said colder substance.

7. Automatic pour-point-measuring apparatus according to claim 6 wherein
    said spherical probe means is constructed of a heat-conductive metal and includes the measuring junction of a thermocouple located therein, and
    said means for resting the probe means also comprises circuit means for connecting said measuring junction to a comparison junction without vertical restraint of the probe means.

8. In combination,
    a predetermined quantity of a substance the pour point of which is to be measured,
    a container for said quantity of substance,
    a temperature-measuring probe adapted for resting on top of said substance when it is below the pour point thereof,
    said probe having an effective density greater than the density of said substance when it is above the pour point thereof,
    means for measuring the temperature of said probe while it rests on the top of said substance and until it has fallen into said substance at least a substantial distance and means for warming said substance only from the top down.

9. The combination according to claim 8, wherein said warming means comprises
    means for heat-insulating said container except 9, the top thereof.

10. The combination according to claim 10, wherein said probe is spherical.

11. The combination according to claim 10, wherein:
    said temperature-measuring means comprises a thermocouple having a measuring junction in said probe.

12. The combination according to claim 11, wherein
    said spherical probe is solid metal having good heat conductivity, and further including
    means for recording said temperature.

13. A method of determining the pour point of a fluid sample, comprising the steps of
    cooling said sample below the pour point thereof,
    providing sufficient heat above and sufficient insulation around and below said sample to initiate melting thereof at the top surface and to cause the progressive travel of a liquid-solid interface from said top surface downward,
    providing a probe for measuring the temperature at said interface,
    measuring and providing a continuous indication of the temperature at said interface as said probe travels, and
    designating a point on said indication which corresponds to a predetermined distance of travel as the pour point.

* * * * *